3,398,200
PREPARATION OF THIOL-ALLENE ADDUCTS
Karl Griesbaum, Elizabeth, and Alexis A. Oswald, Mountainside, N.J., assignors to Esso Research and Engineering Company, a corporation of Delaware
No Drawing. Filed May 18, 1964, Ser. No. 368,345
2 Claims. (Cl. 260—609)

ABSTRACT OF THE DISCLOSURE

Thiol adducts of allene, such as, for example, allyl p-chlorophenyl sulfide and 1,3-bis-p-chlorophenylmercapto-propane, their methods of preparation, and their use in pesticidal compositions which are especially useful nematocides. Such adducts are prepared by reacting a compound having the structural formula RSH with allene in the presence of a suitable catalyst such as ultraviolet light, gamma radiation, and a wide variety of peroxidic and azo compounds.

---

This invention relates to a novel method of preparing adducts of allene and to their utilization in novel pesticidal compositions. More particularly, this invention relates to a process for the direct preparation of mono and dithiol adducts of allene and to the use of these compositions as nematocides.

Nematodes or eelworms represent an alarmingly expanding threat to every agricultural area of the world. The common nematodes are halogenated hydrocarbons, often expensive because of their bromine content. It is known in the art that some organic sulfur-containing compounds possess properties which make them suitable as agricultural chemicals. The importance of these materials has stimulated interest in other compounds which may possess comparable properties and in methods for producing these compounds.

It is, therefore, an object of this invention to provide a novel process for the preparation of mono and dithiol adducts of allene.

Yet another object of this invention is to provide novel nematocidal compositions derived from the allene-thiol adducts.

It has now been discovered that simple thiols may be added directly to allene by a free-radical mechanism under controlled conditions, leading to the mono- and/or dithiol adduct of allene, as desired. Furthermore, it has now been found that selected products of the above-described process may be employed in commercially practical concentrations as pesticidal compositions.

In accordance with a broad aspect of this invention there is now provided a process for preparing thiol mono- and di-adducts of allene, which comprises reacting a compound having the structural formula RSH, wherein R is selected from the group consisting of $C_1$–$C_{20}$ alkyl, $C_6$–$C_{10}$ aryl, $C_7$–$C_{20}$ alkylaryl, $C_7$–$C_{20}$ phenylaryl, and $C_6$–$C_{10}$ halophenyl with allene at a temperature in the range of about $-100$ to about $+60°$ C. and a pressure in the range of about 0 to about 750 p.s.i.g. in the presence of a free-radical catalyst.

In accordance with a more specific aspect or embodiment of this invention there is provided a process for preparing allyl sulfides which comprises reacting a compound having the formula RSH, wherein R is selected from the group consisting of $C_1$–$C_{20}$ alkyl, $C_6$–$C_{10}$ aryl, $C_7$–$C_{20}$ alkylaryl, $C_7$–$C_{20}$ phenylalkyl, and $C_6$–$C_{10}$ halophenyl with allene at a temperature in the range of about $-100$ to about $+60°$ C. and a pressure in the range of about 0 to about 750 p.s.i.g. in the presence of a free radical catalyst, the molar ratio of allene to said RSH being in the range of 3:2 to 10:1.

In accordance with another more specific embodiment of this invention there is provided a process for preparing 1,3-bis-substituted mercaptyl propane which comprises reacting a compound having the formula RSH wherein R is selected from the group consisting of $C_1$–$C_{20}$ alkyl, $C_6$–$C_{10}$ aryl, $C_7$–$C_{20}$ alkylaryl, $C_7$–$C_{20}$ phenylalkyl, and $C_6$–$C_{10}$ halophenyl with allene at a temperature in the range of about $-100$ to about $+60°$ C. and a pressure in the range of about 0 to about 750 p.s.i.g. in the presence of a free-radical catalyst, the molar ratio of said RSH compound to said allene being in the range of 2:1 to 10:1.

The free-radical reaction contemplated by the process of this invention may be schematically represented as follows:

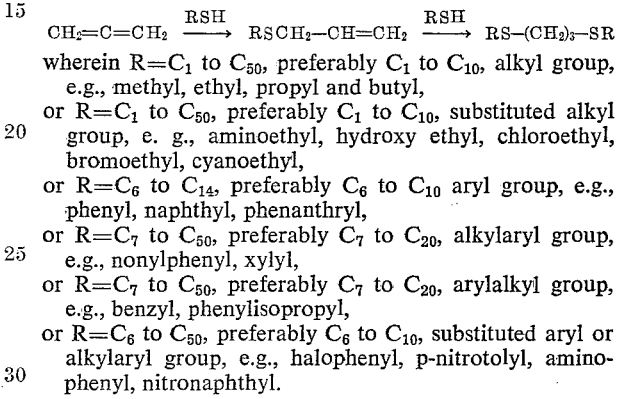

wherein $R = C_1$ to $C_{50}$, preferably $C_1$ to $C_{10}$, alkyl group, e.g., methyl, ethyl, propyl and butyl, or $R = C_1$ to $C_{50}$, preferably $C_1$ to $C_{10}$, substituted alkyl group, e.g., aminoethyl, hydroxy ethyl, chloroethyl, bromoethyl, cyanoethyl, or $R = C_6$ to $C_{14}$, preferably $C_6$ to $C_{10}$ aryl group, e.g., phenyl, naphthyl, phenanthryl, or $R = C_7$ to $C_{50}$, preferably $C_7$ to $C_{20}$, alkylaryl group, e.g., nonylphenyl, xylyl, or $R = C_7$ to $C_{50}$, preferably $C_7$ to $C_{20}$, arylalkyl group, e.g., benzyl, phenylisopropyl, or $R = C_6$ to $C_{50}$, preferably $C_6$ to $C_{10}$, substituted aryl or alkylaryl group, e.g., halophenyl, p-nitrotolyl, aminophenyl, nitronaphthyl.

The preferred thiol reactants are the $C_1$ to $C_4$ alkyls, $C_6$ to $C_{10}$ aryls, alkylaryls and arylalkyls and $C_6$ to $C_{10}$ substituted aryls such as haloaryls since these reactants produce mono and di-thioethers which possess valuable pesticidal properties, especially when employed as nematocides. Particularly preferred examples of such thiol reactants are ethyl, propyl and butyl thiol, benzene thiol and p-chlorobenzene thiol.

The above-described reaction is normally carried out in the presence of a catalyst. The catalysts employable in the novel reaction of this invention are free-radical type initiators and include ultraviolet light, gamma radiation and a wide variety of peroxidic and azo compounds. Typical free-radicals initiators are cumene hydroperoxide, tertiary butyl hydroperoxide, bis-tertiary butyl peroxide, and bis-azo-isobutyronitrile. When free-radical initiator compounds are employed, they will normally constitute 0.5 to 10 wt. percent, preferably 1 to 5 wt. percent, based on allene, of the reaction mixture. In a preferred embodiment, the free-radical catalyst is a combination of a peroxidic or azo compound and ultraviolet initiation. It has been found that ultraviolet irradiation accelerates the free-radical initiator compound decomposition, thereby resulting in an effective chain initiation and, consequently, high yields of the desired products in a short reaction period.

A wide variety of reaction conditions may be employed in the process of the present invention. Suitable reaction temperatures are in the range of $-100$ to $+120°$ C., preferably $-70$ to $+100°$ C., for example, $15°$ C. The reaction pressure is not critical and superatmospheric as well as atmospheric pressures may be employed in the reaction period. Typical reaction pressures are in the range of 0 to 750 p.s.i.g. and preferably 10 to 150 p.s.i.g., for example, 50 p.s.i.g. In a preferred embodiment, the reaction is carried out at room temperature in a sealed reaction chamber. Such a procedure has the effect of creating a pressure in the range of 40 to 120 p.s.i.g. due to the vapor pressure of the allene gas.

The ratio of reactants is a critical feature of this invention, since the above-described reactions may be carried out in such a manner as to produce either the mono- or dithiol adduct of allene. When the mono adduct is the desired major product of the reaction, it is essential that the process be carried out employing an excess of the allene reactant. Suitable molar ratios of allene are in the range of 3:2 to 10:1, preferably 2:1 to 5:1. When the dithiol adduct is the desired major reaction product, the above-described reaction may be carried out employing equivalent amounts of reactants, i.e., 2 moles of thiol per mole of allene, or alternatively, may be carried out in the presence of an excess of the thiol reactant. Typically, the molar ratio of thiol to allene is in the range of 2:1 to 10:1 and preferably 3:1 to 5:1.

The invention will be further understood by reference to the following illustrative examples.

EXAMPLE 1

12 grams (0.3 mole) of allene was condensed at −80° C. in a 100 milliliter quartz tube. 0.1 mole of a mercaptan (RSH) and 0.001 mole of tertiary butyl hydroperoxide were added to the quartz reaction tube. The tube was then sealed and placed into a temperature controlled bath. A 100 watt Hanau ultraviolet immersion lamp was placed about 5 centimeters from the reaction tube, and the tube was irradiated with ultraviolet light during the reaction period specified in Table I. After an arbitrary period of reaction, the sealed tube was opened and the reaction products were analyzed by gas-liquid chromatography and nuclear magnetic resonance. The results of addition reactions of the type described above are summarized in Table I.

TABLE I

| RSH | Reaction Temp., °C. | Reaction Time, hr. | Thiol Conv. Percent | Components in Adduct Mixture, Mole Percent | | |
|---|---|---|---|---|---|---|
| | | | | $RS-CH_2-CH=CH_2$ | $RS-(CH_2)_2-SR$ | $RS-CH(CH_3)-CH_2-SR$ |
| $CH_3SH$ | 17 | 4.66 | 100 | 76 | 12 | 12 |
| $CH_3SH$ | 17 | 1.5 | 100 | 76 | 13 | 11 |
| $CH_3SH$ | −75 | 12 | 100 | 57 | 37 | 6 |
| $C_6H_5SH$ | 17 | 52 | 100 | 70 | 11 | 19 |
| $C_6H_5SH$ | 17 | 3.5 | 100 | 72 | 7 | 21 |

The results of Table I indicate that the addition of a molar excess of allene to a simple thiol results in the selective formation of the monothiol adduct of allene. Furthermore, the results indicate that the utilization of higher reaction temperatures favors the formation of the monothiol adduct. In addition, the table indicates that the 1,2 diadducts formed by center attack of allene are a minor product of the free-radical reaction.

EXAMPLE 2

A stirred mixture of 49.6 grams (0.4 mole) of benzyl mercaptan and 8 grams (0.2 mole) of allene was irradiated with ultraviolet light in a sealed quartz tube at 15° C. for a period of 65 hours. Analysis of the resulting mixture indicated a 95% conversion of the allene. Furthermore, the major product of the reaction (80% yield) was 1,3-bis-benzylmercapto-propane. No monoadduct was observed in the reaction product. The results indicate that the reaction of one mole of allene with two moles of the thiol reactant results in the formation of the dithiol adduct.

EXAMPLE 3

A mixture of 31 grams (0.5 mole) of ethanethiol and 10 grams (0.25 mole) of allene was reacted in the manner described in Example 2. Analysis of the reaction product indicated that the main product was 1,3-bis-ethylmercapto-propane (78%) and that only 4% of the monoadduct (allyl ethyl sulfide) was present.

EXAMPLE 4

A mixture of 55 grams (0.5 mole) of benzenethiol and 10 grams (0.25 mole) of allene was reacted in the manner described in Example 2. Analysis of the addition products indicated that the main product, 54 mole percent, was 1,3-bis-phenylmercapto-propane. The by-products were 26 mole percent of a branched diadduct, 1,2-bis-phenylmercapto-propane, and 20 mole percent of the monoadduct, allyl phenyl sulfide.

EXAMPLE 5

Allene was bubbled into 433.5 grams (3 moles) of molten magnetically-stirred 4-chlorobenzenethiol at 60° C., while it was being irradiated through the quartz reaction vessel by a 100 watt Hanau ultraviolet immersion lamp. The progress of the addition was followed by examination of a change of nuclear magnetic resonance spectrum of the reaction mixture as shown by the following tabulation:

TABLE II

| Reaction Time, hrs. | Conv. Thiol, percent | Molar percent of Adducts Formed | | $\begin{array}{c} ClC_6H_5S \\ \diagdown \\ ClC_6H_5S \end{array} \!\! C \!\! \begin{array}{c} CH_3 \\ \diagup \\ \diagdown CH_3 \end{array}$ |
|---|---|---|---|---|
| | | Monoadduct $Cl-C_6H_5-SCH_2CH=CH_2$ | 1,3-diadduct $(Cl-C_6H_5SCH_2)_2CH_2$ | |
| 16 | 8 | 2 | 2 | 2 |
| 85 | 15 | 1 | 9 | 4 |
| 160 | 39 | 9 | 12 | 7 |

After 160 hours of reaction, the unreacted thiol was removed from the reaction mixture by extraction with 5% aqueous sodium hydroxide solution and the products were separated by a fractional distillation under reduced pressure. In this manner, in addition to the tabulated products, 3 mole percent of 1,2-bis-4-chlorophenylmercapto-propane and 5 mole percent of 4-chlorophenyldisulfide were obtained.

EXAMPLE 6

The monoadduct allyl p-chlorophenyl sulfide and diadduct 1,3-bis-p-chlorophenylmercapto-propane, prepared as outlined in Example 4, where tested for effectiveness as nematocides. The respective samples were prepared by mixing 0.41 gram of a dust formulation containing 10% of the active material, with a gallon of soil. This concentration is equivalent to 100 pounds of dust formulation per 4-inch acre of soil to be treated. By actual application, 5 to 400 pounds of dust formulation per 4-inch acre is normally employed. Nemagon, a commercial nematocide, was used as a positive (100%) control at a concentration of 40 pounds per 4-inch acre. The test was conducted as follows: Meloidogyne sp. nematodes were reared in tomato plant soil medium. Soil for test purposes was inoculated with infected soil and root knots from infected tomato plants. The allyl p-chlorophenyl sulfide and 1,3-bis-p-chlorophenylmercapto-propane samples were blended thoroughly with the soil in a V-shell blender. Four 1-pint paper pots were used for each treatment with 1 tomato transplant per pot. After 3–4 weeks under artificial light and overhead irrigation, the roots of the plants were examined for degree of root knot formation. Inoculated control normally had about 80–100 root knots per plant. Percent control by the allyl p-chlorophenyl sulfide and 1,3-bis-p-chlorophenylmercapto-propane compositions was determined by comparison of the knot counts on treated and untreated tomato plants. The results of the tests are summarized below:

TABLE III

| Active ingredient: | Percent control |
|---|---|
| Allyl p-chlorophenyl sulfide | 95 |
| 1,3-bis-p-chlorophenylmercapto-propane | 85 |

These results clearly indicate that allyl p-chlorophenyl sulfide and 1,3-bis-p-chlorophenylmercapto-propane are effective nematocidal compounds.

The nematocidal compositions of this invention may be employed in either solid or liquid form. When used in solid form, they may be reduced to an impalpable powder and employed as an undiluted dust or they may be admixed with a solid carrier such as clay, talc or bentonite as well as other carriers known in the art.

The compositions may also be applied as a spray, either alone or in a liquid carrier as a solution in a solvent or as a suspension in a nonsolvent. Typical solvents are organic compounds such as acetone, ethyl alcohol, benzene, naphtha, etc., although different compounds exhibit different solubilities for the novel compositions. In some instances, it may be preferable to admix the composition with wetting agents so as to be able to secure aqueous emulsions and consequent uniformity of dispersion in the resulting colloidal system. The use of these wetting agents also increases the spreading action of the spray by decreasing its surface tension. This results in the securing of better contact of the spray with the surface being treated and, consequently, brings the active ingredient into more intimate contact with the parasite life. Suitable wetting agents include the sulfates of long-chain alcohols such as dodecanol and octadecanol, sulfonated amide and ester derivatives, sulfonated aromatic and mixed alkyl aryl derivatives, esters of fatty acids, such as ricinoleic esters of sorbitol and petroleum sulfonates of $C_{10}$ to $C_{20}$ lengths. The nonionic emulsifying agents, such as the ethylene oxide condensation products of alkylated phenols, may also be employed. The compounds of this invention may, of course, be admixed with carriers that are themselves active nematocidal compositions.

It is to be understood that the invention is not limited to the specific examples which have been offered merely as illustrations and that modifications may be made without departing from the spirit of the invention.

What is claimed is:
1. Allyl p-chlorophenyl sulfide.
2. 1,3-bis-p-chlorophenylmercapto-propane.

References Cited
UNITED STATES PATENTS

| 3,315,000 | 4/1967 | Ransley | 260—609 |
| 2,066,191 | 12/1936 | Turner | 260—609 |
| 2,229,665 | 1/1941 | Mochel | 260—609 X |
| 2,354,229 | 7/1944 | Walter | 260—609 |
| 2,439,203 | 4/1948 | Ellingboe | 204—158 |
| 2,843,518 | 7/1958 | Lambrech et al. | 167—22 |
| 2,863,799 | 12/1958 | Goodhue et al. | 167—22 |
| 2,950,237 | 8/1960 | Sharp | 204—158 |

OTHER REFERENCES

Mailloux et al., J. Economic Entomology, vol. 55, p. 480 (1962).

Van Der Ploeg et al., Rec. Trav. Chim, vol. 81, p. 783 (1962).

CHARLES B. PARKER, *Primary Examiner.*

D. R. PHILLIPS, *Assistant Examiner.*